United States Patent Office 2,805,255
Patented Sept. 3, 1957

2,805,255

6- AND 8-ACETYL DERIVATIVES OF 4a-METHYL-7-ISOPROPYL-1,2,3,4,4a,9,10,10a-OCTAHYDRO-PHENANTHRENES ALKYLATED IN THE 1-POSITION

Willard M. Hoehn, Wilmette, Ill., assignor, by mesne assignments, to G. D. Searle & Co., Skokie, Ill., a corporation of Delaware No Drawing. Application August 10, 1954,
Serial No. 449,014

6 Claims. (Cl. 260—586)

This invention relates to a new group of tricyclic ketones and, more specifically, to 6- and 8-acetyl derivatives of 4a-methyl-7-isopropyl-1,2,3,4,4a,9,10,10a-octahydrophenanthrene containing one or two alkyl radicals in the 1-position. These compounds can be represented by the general structural formula

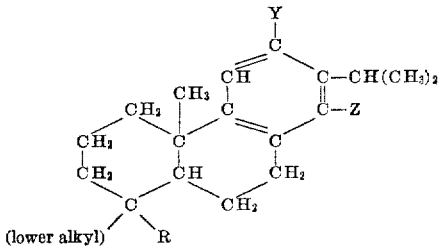

wherein R is a hydrogen or a methyl radical and wherein one of the radicals Y and Z is an acetyl radical, the other being a member of the class consisting of hydrogen and acetyl radicals.

One of the convenient starting materials for the preparation of compounds of my invention containing two methyl groups in the 1-position is dehydroabietane. By application of the Friedel-Crafts reaction to this compound, using acetyl chloride, 6- and 8-monoacetyl and 6,8-diacetyl derivatives are obtained.

Heating of dehydroabietinol with boric acid and destructive dsitillation yields 1-ethylidene-4a-methyl-7-isopropyl-1,2,3,4,4a,9,10,10a-octahydrophenanthrene and some 1-ethyl-4a-methyl-7-isopropylhexahydrophenanthrenes which on hydrogenation yield 1-ethyl-4a-methyl-7-isopropyl-1,2,3,4,4a,9,10,10a-octahydrophenanthrene. One of the convenient methods for the introduction of lower alkyl groups larger than ethyl in the 1-position consists in the treatment of dehydroabietyl chloride with a lower dialkyl cadmium and reduction of the resulting ketone by the Wolff-Kishner procedure to the 1,4a-dimethyl-1-lower alkyl-7-isopropyl-1,2,3,4,4a,9,10,10a-octahydrophenanthrenes. Under Friedel-Crafts conditions these compounds can be mono-acetylated in the 6- and 8-position by treatment with acetyl chloride in the presence of aluminum chloride. Under more forcing conditions, 6,8-diacetylation occurs.

These acetyl derivatives are highly valuable medicinal agents and, more particularly, anti-hypertensive agents. They are also of great utility as intermediates in the synthesis of other medicinal agents.

Treatment of my new 6- and 8-acetyl compounds with benzaldehyde or a nuclearly substituted derivative thereof such as anisaldehyde yields the corresponding cinnamoyl derivatives.

The following examples will illustrate in further detail the compounds which constitute my invention, methods for their synthesis and conversion to other pharmaceutically valuable compounds. However, my invention is not to be construed as limited thereby in spirit or in scope as it will be obvious to those skilled in the art that numerous modifications in materials and operating conditions can be adopted without departing from the invention. In these examples quantities of materials are indicated in parts by weight and pressures during vacuum distillation are indicated in millimeters (mm.) of mercury.

Example 1

In the course of 2 hours, 16.5 parts of aluminum chloride are added with stirring to a solution of 16.2 parts of dehydroabietane in 200 parts of nitrobenzene and 4.7 parts of acetyl chloride while the temperature is maintained at 0–5° C. The reaction mixture is then poured on ice and 65 parts of 10% hydrochloric acid and the organic layer is separated and diluted with 450 parts of ether. It is then washed successively with water, 2% sodium hydroxide solution and again with water, dried over anhydrous sodium sulfate, filtered and evaporated. The residue is distilled at about 0.04 mm. pressure and the fraction obtained at about 162–175° C. is crystallized from dilute acetone. The specific rotation of the 1,1,4a-trimethyl-6-acetyl-7-isopropyl-1,2,3,4,4a,9,10,10a-octahydrophenanthrene thus obtained in 1% chloroform solution is +59.5°. Infrared absorption spectrum shows maxima at 5.99, 6.25, 7.39, 7.92 and 8.20 microns. The compound has the structural formula

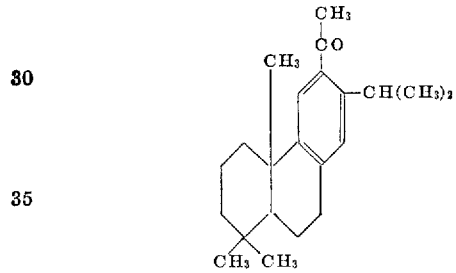

The 2,4-dinitrophenylhydrazone of this compound melts at about 232–234.5° C.

The mother liquors from the acetone crystallizations are combined and taken to an oily residue under vacuum, and the residue is distilled at about 118–120° C. and 0.03 mm. pressure. There is thus obtained the 1,1,4a-trimethyl-7-isopropyl-8-acetyl-1,2,3,4,4a,9,10,10a-octahydrophenanthrene. The infrared absorption spectrum shows maxima at 5.97, 6.22, 7.38, 7.92, 8.18 and 12.08 microns. The compound has the structural formula

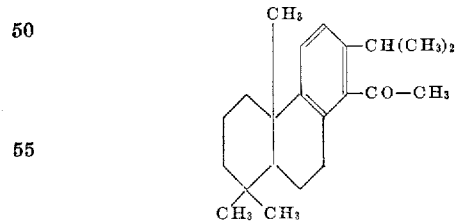

The 2,4-dinitrophenylhydrazone of 1,1,4a-trimethyl-7-isopropyl-8-acetyl-1,2,3,4,4a,9,10,10a-octahydrophenanthrene melts at about 230–233° C.

Example 2

To a solution of 92 parts of dehydroabietane in 600 parts of tetrachloroethane are added 29.5 parts of acetyl chloride. The mixture is cooled to 0° C. and 90 parts of aluminum chloride are added in the course of an hour. After storage at 0° C. for 12 hours, the mixture is allowed to warm up to room temperature, maintained at 25° C. for an hour, and then acidified with 10% hydrochloric acid. The organic solution is separated and steam-distilled. The organic layer is separated from the residue, diluted with 850 parts of ether and washed with water to neutrality. It is then dried over anhydrous sodium sulfate, filtered and evaporated. The 1,1,4a-trimethyl - 6 - acetyl - 7 - isopropyl - 1,2,3,4,4a,9,10,10a-octahydrophenanthrene and 1,1,4a-trimethyl-7-isopropyl-8-acetyl-1,2,3,4,4a,9,10,10a-octahydrophenanthrene are removed by vacuum distillation at 0.03 mm. pressure and at 115–152° C. The residue is dissolved in 95% hot ethanol. On cooling, a crystalline precipitate is obtained which, recrystallized from 95% ethanol, melts at about 157–158° C. The specific rotation of a 0.5% chloroform solution is +47°. Infrared maxima are observed at 5.99, 7.26, 7.38, 7.92, 8.15 and 9.22 microns. The 1,1,4a - trimethyl - 6,8 - diacetyl - 7 - isopropyl - 1,2,3,4,4a,9,10,10a-octahydrophenanthrene thus obtained has the structural formula

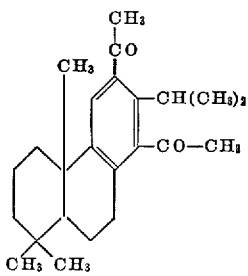

*Example 3*

A mixture of 4.5 parts of 1,1,4a-trimethyl-6-acetyl-7-isopropyl - 1,2,3,4,4a,9,10,10a - octadrophenanthrene, 3 parts of benzaldehyde, 40 parts of methanol and 0.5 part of sodium in 16 parts of methanol is refluxed for 20 minutes and then treated with a sufficient amount of 10% aqueous hydrochloric acid to make the solution acid. It is then steam distilled and the residue is extracted with ether. The ether extract is washed successively with water, 4% aqueous sodium hydroxide solution and again with water, dried over anhydrous sodium sulfate, filtered and evaporated. The gummy residue is dissolved in a small amount of ether and treated with methanol. A precipitate forms on standing which is recrystallized from 90% methanol. The 1,1,4a-trimethyl - 6 - cinnamoyl - 7 - isopropyl - 1,2,3,4,4a,9,10,10a-octahydrophenanthrene melts at about 88–90° C. The specific rotation of a 1% chloroform solution is +61°. Infrared maxima are observed at 6.02, 6.14, 6.25, 7.26 and 7.82 microns.

*Example 4*

To a solution of 1.6 parts of 1,1,4a-trimethyl-6-acetyl-7-isopropyl-1,2,3,4,4a,9,10,10a-octahydrophenanthrene in 16 parts of methanol are added a solution of 0.25 part of sodium in 6 parts of methanol and 2.2 parts of anisaldehyde. The mixture is heated on a steam bath and about 50% of the methanol is permitted to distill off. The reaction mixture is then acidified by the addition of dilute hydrochloric acid and the excess anisaldehyde is removed by steam distillation. The aqueous layer is removed and the gum is crystallized from a mixture of ether and methanol. The crystals are dissolved in 35 parts of ether, stirred with charcoal, filtered and treated with 25 parts of methanol. The ether is removed by distillation. There is thus obtained crystalline 1,1,4a-trimethyl - 6 - (p - methoxycinnamoyl) - 7 - isopropyl - 1,2,3,4,4a,9,10,10a-octahydrophenanthrene which melts at about 112–113° C. The ultraviolet absorption spectrum shows a maximum at 330 millimicrons with a molecular extinction coefficient of 28,200. The specific rotation of an 0.5% chloroform solution is +55°.

*Example 5*

To a mixture of 3 parts of 1,1,4a-trimethyl-7-isopropyl-8 - acetyl - 1,2,3,4,4a,9,10,10a - octahydrophenanthrene and 2.2 parts of anisaldehyde in 16 parts of methanol are added 0.5 part of sodium in 16 parts of methanol and the mixture is heated on a steam bath for 20 minutes. Then a sufficient amount of 10% aqueous hydrochloric acid is added to make the solution acidic and the excess of anisaldehyde is removed by steam distillation. The gum in the residue is separated and dissolved in the ether. The solution is washed successively with water, 2% aqueous sodium hydroxide solution and again with water, dried over anhydrous sodium sulfate and filtered. Most of the ether is removed by vacuum distillation and the residue is distilled at 0.02 mm. pressure. At about 220–225° C., there is obtained the 1,1,4a-trimethyl-7-isopropyl - 8 - (p - methoxy - cinnamoyl) - 1,2,3,4,4a,9,10,10a-octahydrophenanthrene. The ultraviolet absorption spectrum shows an inflection at 230 millimicrons and a maximum at 329 millimicrons with molecular extinction coefficients of 12,920 and 26,700, respectively.

*Example 6*

A mixture of 120 parts of dehydroabietinol and 30 parts of boric acid are heated together over a 2-hour period to 150–160° C. and then destructively distilled at 0.07 mm. pressure. The distillate is redistilled at about 0.025 mm. pressure and 122–125° C.

20 parts of the distillate are dissolved in 50 parts of glacial acetic acid and hydrogenated in the presence of 0.05 part of platinic oxide at 2–3 atmospheres pressure until 1 molecular equivalent of hydrogen has been taken up. The mixture is then diluted with 50 parts of ethyl acetate and filtered. The filtrate is taken up in 150 parts of ether and washed successively with water, 5% sodium hydroxide solution and again with water to neutrality. The ether solution is dried over anhydrous sodium sulfate, filtered and submitted to vacuum distillation to remove 90% of the ether. The residue is vacuum distilled at 0.02 mm. pressure and 110–115° C. to yield 1-ethyl-4a - methyl - 7 - isopropyl - 1,2,3,4,4a,9,10,10a - octahydrophenanthrene.

In the course of an hour 80 parts of aluminum chloride are added to a stirred solution of 81 parts of this product in 600 parts of nitrobenzene and 25 parts of acetyl chloride while the temperature is maintained at 0–5° C. Stirring at that temperature is continued for an hour, after which the reaction mixture is poured on ice. The organic layer is separated, diluted with ether and washed successively with water, 2% sodium hydroxide solution and again with water, dried over anhydrous sodium sulfate, filtered and evaporated. The product is distilled at 0.02 mm. pressure at about 145° C. About 400 parts of methanol are added to the viscous product and this mixture is cooled in an ice bath. A solid forms which is collected and washed on the filter with methanol. Recrystallized three times from methanol the 1-ethyl-4a-methyl-6-acetyl-7-isopropyl-1,2,3,4,4a,9,10,10a-octahydrophenanthrene thus obtained melts at about 138° C. after softening at about 130° C. The specific rotation of a 1.02% solution in chloroform is +80.9°. The infrared absorption spectrum shows maxima at 5.97, 7.30, 7.37 and 7.92 microns. The structure of the compound is

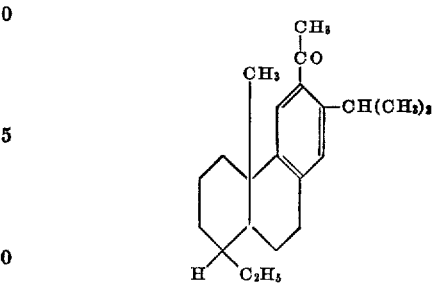

The methanol is removed from the mother liquor and the product is distilled at 0.03 mm. pressure at 150–155° C. The specific rotation of a 1.05% chloroform solution is +27.6°. The 1-ethyl-4a-methyl-7-isopropyl-8-acetyl-1,2, 3,4,4a,9,10,10a-octahydrophenanthrene thus obtained has the structural formula

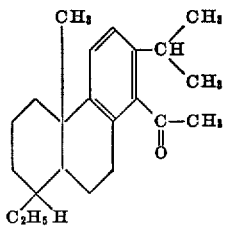

A 2,4-dinitrophenylhydrazone of this compound melts at 155–157° C.

*Example 7*

A mixture of 10 parts of 1-ethyl-4a-methyl-7-isopropyl-1,2,3,4,4a,9,10,10a-octahydrophenanthrene, 65 parts of tetrachloroethane and 32 parts of acetyl chloride is cooled to 0° C. and treated at that temperature in the course of 1 hour by the gradual addition of 10 parts of aluminum chloride. The mixture is stored at 0° C. for 12 hours, then at 25° C. for 2 hours and acidified with 10% hydrochloric acid. The organic solution is separated and steam-distilled. The organic layer of the residue is separated, diluted with ether and washed with water to neutrality. The ether solution is then dried over anhydrous calcium sulfate, filtered and evaporated. The 1-ethyl-4a-methyl-6-acetyl-7-isopropyl-1,2,3,4,4a,9,10,10a-octahydrophenanthrene and 1-ethyl-4a-methyl-7-isopropyl-8-acetyl-1,2,3,4,4a,9,10,10a-octahydrophenanthrene are removed by vacuum distillation at 0.03 mm. pressure and 150–160° C. The residue is recrystallized from 95% ethanol, giving a product whose infrared absorption spectrum shows maxima at 5.98, 7.26, 7.4, 7.9, 8.15 and 9.2 microns. The 1-ethyl-4a-methyl-6,8-diacetyl-7-isopropyl-1,2,3,4,4a,9,10,10a-octahydrophenanthrene thus obtained has the structural formula

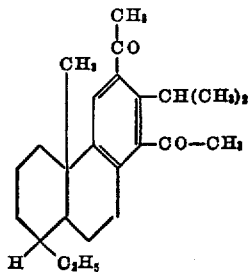

I claim:
1. A compound of the structural formula

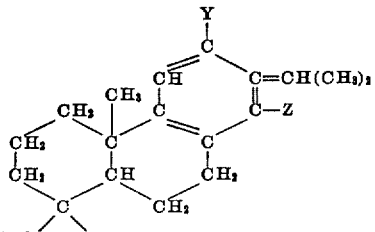

wherein R is a member of the class consisting of hydrogen and methyl radicals and wherein one of the radicals Y and Z is an acetyl radical, the other being a member of the class consisting of hydrogen and acetyl radicals.

2. 1,1,4a - trimethyl - 6 - acetyl - 7 - isopropyl - 1,2,3,4, 4a,9,10,10a-octahydrophenanthrene.

3. 1,1,4a - trimethyl - 7 - isopropyl - 8 - acetyl - 1,2,3,4, 4a,9,10,10a-octahydrophenanthrene.

4. 1,1,4a - trimethyl - 6,8 - diacetyl - 7 - isopropyl - 1,2, 3,4,4a,9,10,10a-octahydrophenanthrene.

5. 1 - ethyl - 4a - methyl - 6 - acetyl - 7 - isopropyl - 1,2, 3,4,4a,9,10,10a-octahydrophenanthrene.

6. 1 - ethyl - 4a - methyl - 7 - isopropyl - 8 - acetyl - 1,2, 3,4,4a,9,10,10a-octahydrophenanthrene.

References Cited in the file of this patent
UNITED STATES PATENTS

| 2,054,107 | Wahlforss et al. | Sept. 15, 1936 |
| 2,331,596 | Campbell | Oct. 12, 1943 |
| 2,390,736 | Price et al. | Dec. 11, 1945 |
| 2,703,796 | Ritchie | Mar. 8, 1955 |
| 2,703,809 | Ritchie | Mar. 8, 1955 |

UNITED STATES PATENT OFFICE
CERTIFICATE OF CORRECTION

Patent No. 2,805,255 September 3, 1957

Willard M. Hoehn

It is hereby certified that error appears in the printed specification of the above numbered patent requiring correction and that the said Letters Patent should read as corrected below.

Column 1, line 37, for "compaunds" read -- compounds --; line 43, for "dsitillation" read -- distillation --; column 3, line 31, for "octadrophenanthrene" read -- octahydrophenanthrene --; column 6, lines 4 to 7, claim 1, upper right-hand portion of the formula should appear as shown below instead of as in the patent --

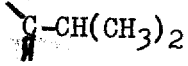

Signed and sealed this 5th day of November 1957.

(SEAL)
Attest:

KARL H. AXLINE

Attesting Officer

ROBERT C. WATSON
Commissioner of Patents